Aug. 2, 1960 H. A. STICKEL 2,947,974

CODE SELECTIVE DEVICE

Filed Sept. 23, 1957 3 Sheets-Sheet 1

INVENTOR.
HAROLD A. STICKEL
ECKHOFF & SLICK
ATTORNEYS
BY [signature]
A MEMBER OF THE FIRM INVENTOR.
HAROLD A. STICKEL
ECKHOFF & SLICK
ATTORNEYS
BY [signature]
A MEMBER OF THE FIRM Aug. 2, 1960 H. A. STICKEL 2,947,974

CODE SELECTIVE DEVICE

Filed Sept. 23, 1957 3 Sheets-Sheet 3

INVENTOR.
HAROLD A. STICKEL
ECKHOFF & SLICK
ATTORNEYS
BY
A MEMBER OF THE FIRM

United States Patent Office 2,947,974

Patented Aug. 2, 1960

2,947,974

CODE SELECTIVE DEVICE

Harold A. Stickel, 765 Clementina St., San Francisco, Calif.

Filed Sept. 23, 1957, Ser. No. 685,724

7 Claims. (Cl. 340—164)

This invention relates to a signal responsive device or decoder and more particularly to a device capable of responding to a selected signal wherein the signal consists of one or more groups of integer signals as is exemplified by the signal which is generated by a conventional telephone dial. In other words, the signal consists of a series of electrical pulses of uniform length or, less commonly, interruptions. If more than one group of pulses is used, the pulses within each group are uniformly spaced, followed by a pause which is substantially longer than the space between the pulses within the group which, in turn, is followed by a second grouping of uniformly spaced pulses, and so on. The device of the present invention is a simple and reliable device wherein a switch is actuated by a predetermined integer signal or signals. Typical integer signals are shown as Figures 4 and 6 of my Patent 2,575,198.

It is an object of the present invention to provide a device which is simple and foolproof in operation and which will respond to a predetermined integer signal.

Another object of this invention is to provide a device which is adapted to respond to more than one different integer signal.

Still another object of this invention is to provide a device of the class described wherein the code may be readily changed without the use of tools or other equipment.

Still another object of the present invention is to provide a device which may be readily adapted to respond to a large number of code combinations so that many of the devices may be operated off of the same line and each device will respond only to the code or codes assigned to it. Other objects and features of advantage will be apparent from the balance of the specification.

In the drawings forming a part of this application:

Figure 1:
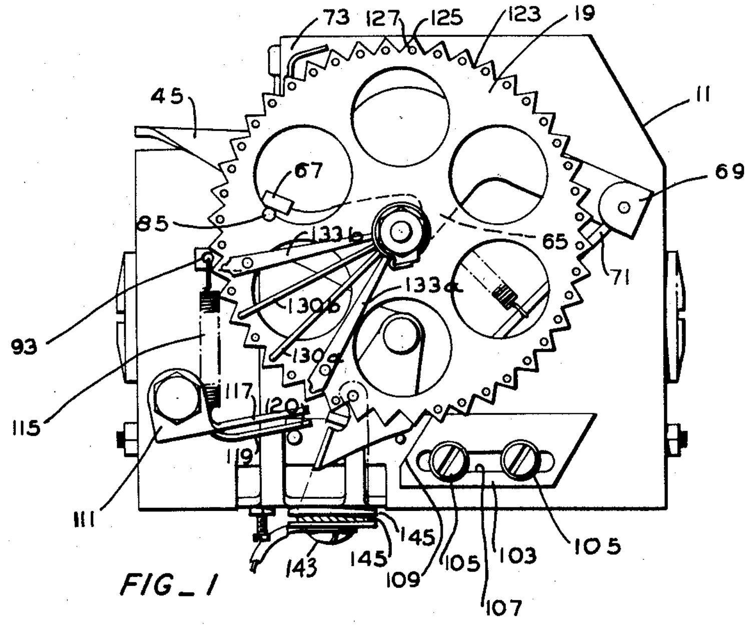
Figure 1 is a plan view of a preferred embodiment of the present invention.
Figure 2:
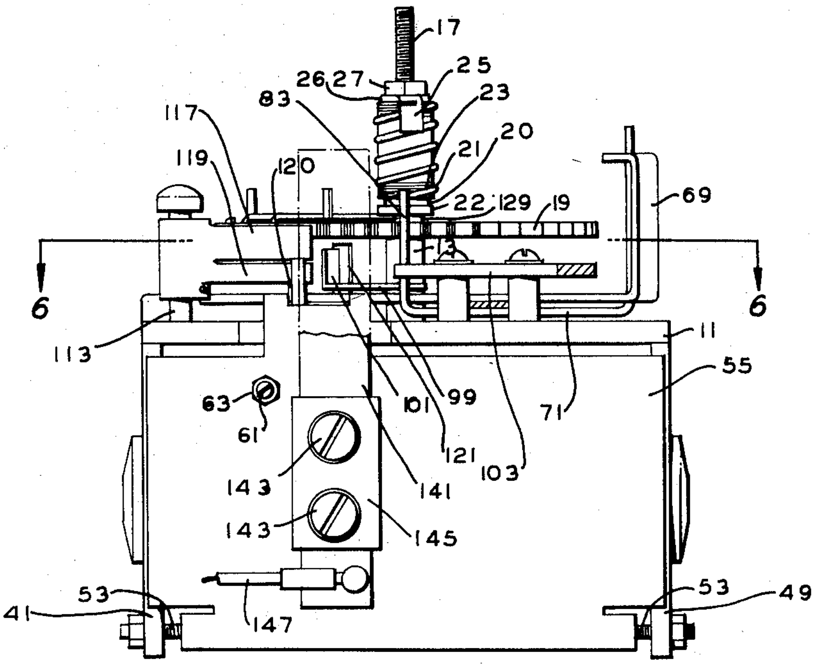
Figure 2 is a side view of the device of the present invention.

Referring now to the drawings by reference characters, there is shown a device having a top plate 11 to which is attached a stud 13. Extending from the stud 13 is a shaft 15, the upper portion of which is threaded as at 17. A code plate 19 having a hub 20 is mounted for rotation on the shaft 15. The hub 20 has a flange 22 thereon. The code wheel 19 is biased for rotation in a clockwise direction as seen in Figure 1 by the spring 21. The lower portion of spring 21 is fastened to the code wheel hub 20 as at 23, while the upper portion of the spring 21 fastens around the spring holder 25; the spring holder 25 is held in place by tension between a threaded cap 26 and the nut 27. Cap 26 also serves to retain the code wheel 19 on the shaft 15. It will be understood that the tension on the spring can be regulated by rotating the spring holder 25 and that it can be clamped into any desired position by means of the nut 27 on the shaft 17.

Figure 3:
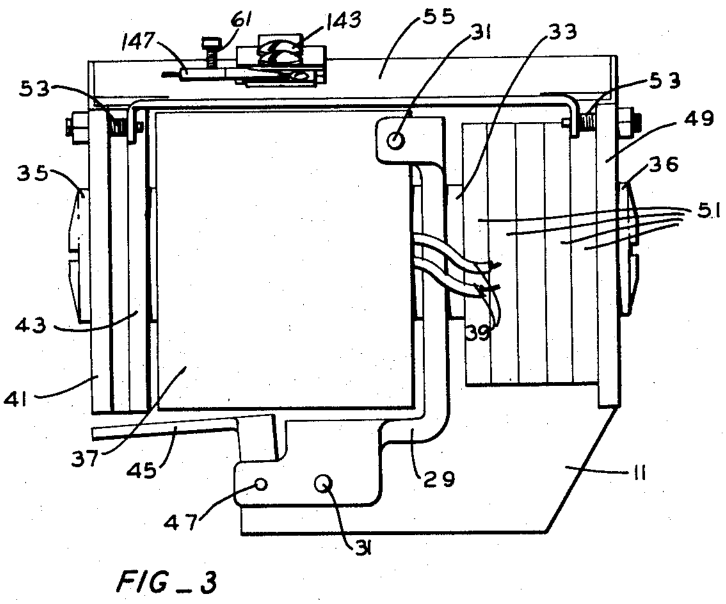
Figure 3 is a bottom view of the device of the present invention.

The top plate 11 has fastened thereto an L-shaped member 29, the bottom of which may be provided with threaded holes 31 for attaching the decoder to a suitable base member, not illustrated. The member 29 is made of a paramagnetic material and supports a core 33 having ends 35 and 36, which extend on each side thereof. The core 33 has thereon a winding 37 of suitable inductance, depending upon the voltage of the circuit with which the device is to be used. Leads 39 carry electricity to the winding 37. Attached to the end of the core end designated 35 is an end plate 41 which is also of paramagnetic material, and similar paramagnetic plates 43 lie parallel with the end plate 41. An armature of paramagnetic material 45 is provided which is pivoted on the member 29 at two spaced points, one of which is shown at 47 in Figure 3 and the other of which is directly under the point marked 73 in Figure 1. The armature 45 extends above the top plate 11 but the portion extending above the plate is dsecribed hereinafter. It will be noted that the armature 45 completes a short magnetic path formed by the core 35, the member 29, and the members 41 and 43. The armature 45 responds almost instantly to both pulses of current and interruptions thereof, and is hereafter known as the fast-moving or pulsing armature.

The end of the core designated 36 has attached thereto an end plate 49 of a paramagnetic material and between the end plate 49 and the member 29 are a series of slugs 51 of an electrically conducting but non-magnetic material, such as copper. Pivoted between the plates 41 and 49 by means of the pins 53 is a second armature 55. The armature 55 completes the magnetic path from the core 33 through the end plates 41 and 49 and it will be noted that this magnetic path passes through the slugs 51. The slugs 51, as is well known to those skilled in the art, delay the collapse of the magnetic field so that if the current is momentarily interrupted, the armature 51 will not be released but will only be released when there is a relatively long current interruption. To permit adjustment of the length of time through which the slow-moving armature remains closed after a pulse has been received, a thin leaf 59 of a paramagnetic material is fastened thereto by means of a rivet near the center of armature 55. A bolt 61 is threaded through the slow-moving armature and the bolt is provided with a jamb nut 63. Thus, by adjusting the screw 61, which bears against the leaf 59, the hang-up or retention time of the slow-moving armature may be delicately adjusted.

The top portion of the fast-moving armature 45 is bent over to form an arm generally designated 64 and has a first ear 65, a second ear 67, and terminates in a U-shaped member 69, to which is attached the driving arm 71. The lower portion of the fast-moving armature 45 is pivoted, as heretofore described, at 47, while the upper portion is pivoted at 73. The fast-moving armature is held in a normally extended position by means of the spring 75 which bears against the fast-moving armature at 77 and is hooked around the stud 13 at 79. The ear 65 serves a twofold purpose. In the first place, when the fast-moving armature 45 is in the extended position, the ear 65 bears against the center post 13 acting as a stop to prevent the armature from swinging too far away from its magnetic path. In the second place, the ear 65 serves to hold the spring 81, the opposite end of which is attached to the driving arm 71; the spring 81 holds the driving pin 83 of arm 71 in contact with the code wheel 19. The second ear 67 contacts the stop 85 which extends downwardly from the code wheel 19, preventing rotation of the code wheel beyond this point and giving a point of reference for starting of the code operation.

The slow-moving armature 55 is bent inwardly over the top plate 11 to form an arm, generally designated 87. The arm 87 has a cutout center portion 89 which fits over a pin 91 extending upwardly from the top plate 13; the pin 91 acts as a stop to prevent the armature from swinging too far outwardly from its magnetic path during long current interruptions. The arm 87 has extending therefrom at one side a spring-holding extension 93 and at the opposite side, the lockout lever 95 is pivoted at 97. The lockout lever 95 is free to swing on its pivot and one edge thereof is formed into the cam surface 99, while adjacent to the cam surface 99 is the upstanding flag 101. A notch 100 is provided adjacent pawl 101. The driver stop plate 103 is fastened, as by means of the screws 105, to the top plate 11. The screws 105 pass through slots 107 in the stop so that the stop may be readily adjusted. The edge of the stop 103 has an angular surface 109 thereon as is shown. A pawl 111 is pivoted on the pin 113 attached to the top member 11 and is normally retained in contact with the code wheel 19 by means of the spring 115 which is attached between the pawl and the spring holder 93. The pawl itself is split at the end, forming an upper member 117 and a lower member 119. The upper member 117 is used to hold the code wheel in place by engaging notches thereon when the pawl is in the operative position. The lower member 119 has an arm 120 extending downward therefrom which extends into the cutout portion 89 of arm 87. When the slow moving armature 55 is in the attracted or "in" position, the tension on spring 115 is increased and there is no contact between arm 120 and arm 87, so that the pawl 111 is urged into engagement with the serrated wheel 19. As the armature moves out, the tension on spring 115 decreases and at the same time the abutment of the opening 89 engages arm 120 forcing it outward so that the pawl 111 can no longer restrain the rotation of wheel 19. Extending upwardly from the arm 87 is also the slow release armature ear 121, the exact function of which will be described hereafter.

Figure 4:
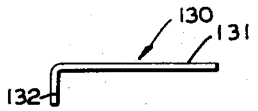
Figure 4 is a side view of one of the code pins which are used to separate code groups.
Figure 5:
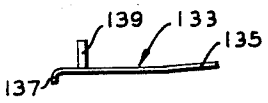
Figure 5 is a side elevation of a contact pin which is normally employed at the end of a code group.

The code plate 19 has a series of evenly spaced serrations formed by notches 123 and teeth 125. At the center of each tooth 125 is a small hole 127. The flange 22 of hub 20 forms an annular notch 129 which serves to retain the code pins and contact pins in place. In Figure 4, there is shown one of the code pins 130 which may be merely a short piece of wire having a shank portion 131 and a downturned end portion 132. A contact pin is shown in Figure 5, and this is preferably in the form of a slightly flattened piece of metal generally designated 133 having a slightly upturned end 135 and a short downturned end 137 at the opposite end thereof. Near the end 137 is the upstanding contactor 139. The code pins and contact pins may be easily placed on the coding wheel 19 merely by placing the downturned ends 132 or 137 into one of the holes 127, and then depressing the back of the pins 131 or 135, and slipping the depressed end into the notch 129 whereupon it is held by the spring action of the pin. Thus, one can change code combinations on the wheel quite readily without the use of any tools or other equipment. In the embodiment shown in the drawings, and, particularly, Figure 1, two contact pins **133–*a* and 133–*b* have been used as well as two coding pins 130**.

Figure 9:
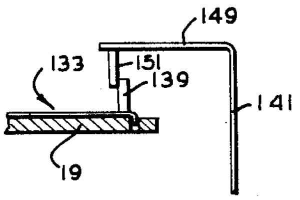
Figure 9 is a partial side view of certain parts at the time when contact is made.

Attached to the slow release armature 55 is the contact arm 141. The arm 141 is held in place by screws 143 and is insulated from the armature 55 by means of fiber insulators 145. A wire 147 connects the contact arm to the circuit being controlled, the circuit being completed through the frame of the instrument. The upper portion of arm 141 is bent over the top of the instrument to form contact strip 149 and a contact pin 151 extends downward therefrom as shown in Figure 9.

With the code and contact pins set up as is shown in Figure 1, the device will respond to either the code 2 by itself or by the combination code 4–2–2. This, of course, is merely for the purpose of illustration and a large variety of codes may be set up on the device. In this particular instance, code 2 was selected as an "all call" signal so that a number of selectors could be set up, all of which would respond to code 2. Each individual selector would be given an additional 2, 3 or even a larger number of digits code so that each individual selector will respond to either its own particular code and also to the all call signal.

For operation, the device is adjusted so that the slow-releasing armature will not release between cycles within a code group but will release between code groups. Thus, the length of each pulse is not critical but the space between pulses within a code group must not exceed the retention time of the slow-moving armature, while the space between code groups is not critical so long as the space is long enough to allow the slow-releasing armature to release.

Figure 6:
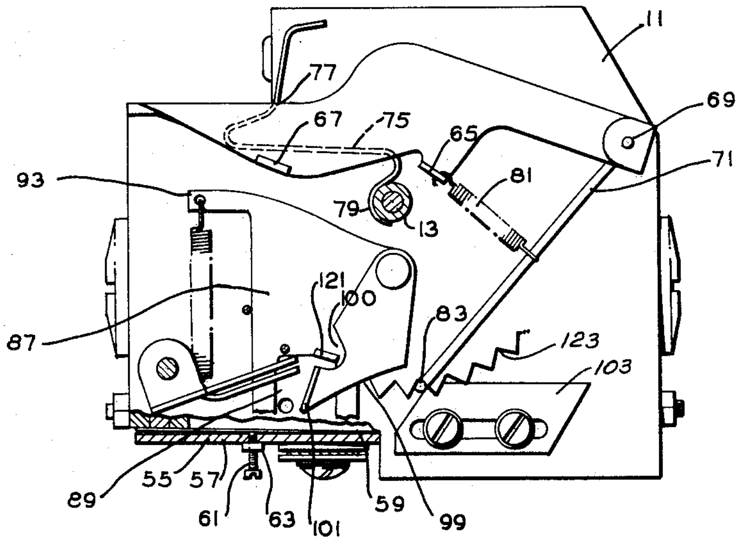
Figure 7:
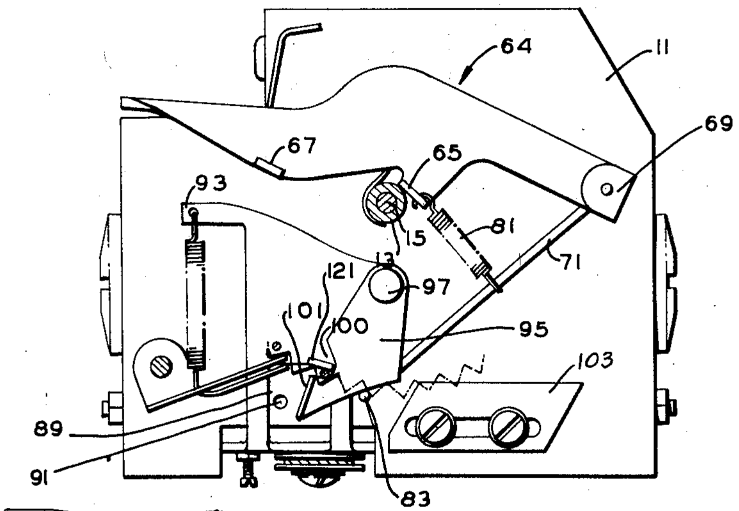

Turning now to the description of the way in which the device works, the device is shown in Figure 1 in the rest position with both armatures unattracted. It will be noted that in this position the code wheel 19 is in its fully clockwise position and is held in this position by contact between the pin 85 on the code wheel against the ear 67 on armature 45. As code pulses are sent to the device, the two armatures are attracted as is shown in Figure 6. This causes the arm 71 to move upwardly so that the driver pin 83 of the arm engages one of the notches of the code wheel and, simultaneously, the slow-moving armature has moved inwardly, which of course has released the lockout lever 95 and pawl 101. Thus, a movement of both armatures serves to unlock the device and also to advance the code wheel by one notch. As the pulsing armature 45 returns to its outward position, the pawl 111 engages a serration on the code wheel, holding it in the first advanced position. Then, when a second pulse is received, the pulsing armature can then again advance the code wheel through one notch. When the code group ends with the same number of pulses that the wheel is set for, i.e., 4 pulses in the example given, the parts are held in position as shown in Figure 7. In this position, the slow-releasing armature has been released magnetically, but is held mechanically in an intermediate position by engagement of the end 132 of code pin **130–*a* against the ear 121**. This also serves to hold the code wheel in the advanced position and ready for the reception of the next group of pulses.

Figure 8:
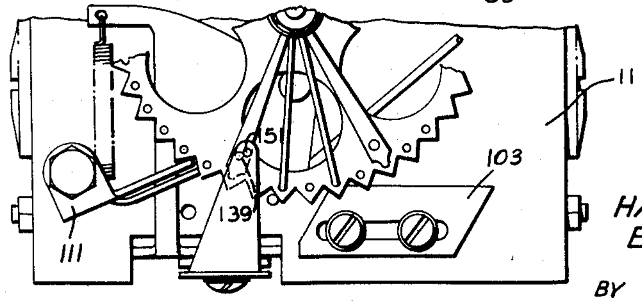
Figure 8 is a partial plan view of the device showing the position of the parts at the time when a contact is made.

If two more successive pulses are then received, the code wheel will be advanced two notches and held on the second code pin **130–*b* exactly as it was held on the first code pin 130–*a*. Then if two additional pulses are received, the contactors 139 (of 133–*b*) and 151 on contact strip 149 are brought into alignment and, as the slow-releasing armature releases, the contactors 139 and 151 engage each other as is shown in Figures 8 and 9, which serves both to complete the electrical circuit to be controlled and also mechanically locks the code wheel in the advanced position. If one additional pulse is now sent, the slow-releasing armature moves inwardly, releasing the code wheel and, at the same time, the pulsing armature moves the code wheel one position forward. Upon the release of the two armatures, the code wheel 19 is not restrained and thus spring 21** returns it to the starting position.

In this example, if the first group had been two pulses (the "all call" signal), the code wheel would have been advanced two notches and the contact would have been established with 133–*a*, rather than 133–*b*, as described above. Again, a single pulse will clear the instrument.

Figure 10:
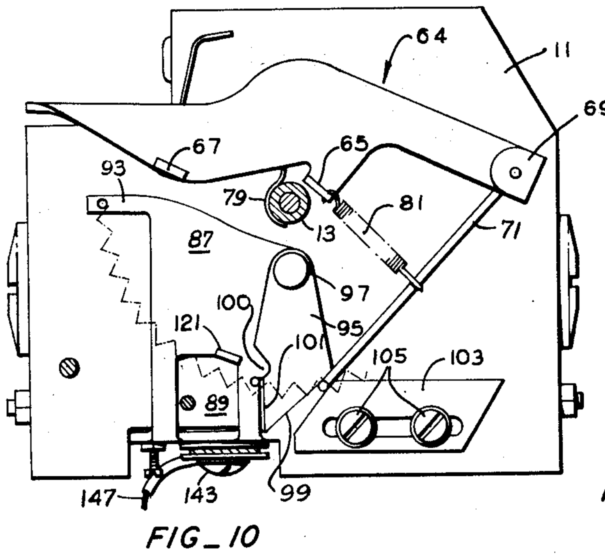
Figures 6, 7 and 10 are plan views taken on the line 6—6 of Figure 2 showing the parts in various stages of actuation by a signal.

The above has assumed that the correct code combination has been sent to actuate the series. However, the selector of the present invention has various safety devices built into it to prevent it from responding to the wrong code. Thus, the above grouping of 4–2–2 must be sent to the device and any other combination will not actuate the switch, even if the wrong combination adds up to the correct number of pulses. For instance, if the first code group had been 3, the device would have moved to the third notch on the code wheel but when the slow-releasing armature released, the arm 120 on pawl 111 would be engaged by the edge of the opening 89 and the pawl would have been pulled away from the code wheel, so that it would have gone back to the starting position. On the other hand, if the first group was one of 5 pulses, the code wheel would have gone one notch past the position where the pin end 132 could engage the ear 121, so that the code wheel would go back to its starting position when the slow-releasing armature released. Further, had the first group constituted 6 or more pulses, the 5th pulse would cause the pin end 132 to engage the flag 101, rotating the lockout lever 95 to the position shown in Figure 10; this would prevent further rotation of the code wheel (by the 6th pulse) and the cam surface 99, acting with surface 109 of the driver stop 103, prevents the driving arm 83 from contacting the code wheel. Again, upon the release of the slow-moving armature, the code wheel would return to its starting position.

A single pulse is used as a clearing pulse, so it is undesirable to use a single pulse as part of a code group. For ease in illustrating the invention, the "all call" position was shown to be 2 while the code was 4–2–2. However, it is not desirable to use the same number as an all call position as is used in one of the code groups since a false "all call" indication could be obtained.

Many variations can be made in the structure shown without departing from the spirit of this invention. For example, the code wheel may be replaced with a reciprocating straight member as is shown in my Patents 2,575,198 and 2,595,614. Further, it has been assumed that an open circuit would be used and that a series of electrical pulses would be sent to the instrument. It will be apparent that the operation can be reversed for closed circuit operation wherein a series of current interruptions produce the integer signal.

It will be noted that there is no false momentary contact before the proper contact is made. In many selector systems, momentary false contacts are made even if a different code is being received. This necessitates the used of a slow acting relay in conjunction with the system which is unnecessary with the system of the present invention.

It should be noted (see Figure 8) that at the time contact is made the two contact points are not in axial alignment with the code wheel but that the contact on the armature 151 is offset in the direction of the bias of the code wheel with respect to the contact 139 on the code wheel. Thus, the action of the spring 21 in biasing the code wheel causes the contacts to wedge together, rendering the device vibration resistant.

I claim:

1. A selective code signal receiving device comprising: in combination, a movable control element; propelling means for said control element; means for engaging said propelling means with said control element for advancing said control element from a normal position to a first advanced position on receipt of a first pulse group, and thereafter from said first advanced position to a farther advanced position on receipt of an additional pulse group; a member carried by said control element at a point corresponding to said first advanced position; a slow releasing element responsive once to a pulse group and releasing upon the completion of said group; a blocking element carried by said slow releasing element, said blocking element obstructing the path of the said member and preventing further advancement of said control element when the said slow releasing element is actuated and moving out of the path of the said member upon a predetermined release movement less than full release of the said slow releasing element; holding means releasable by actuation of the slow releasing element to engage said moveable control element and prevent retrograde movement of the control element except when the slow releasing element is fully released; a contact member carried by said control element and a second contact member fixed generally in the path of said first contact member, said contact members being so positioned that when said control element is at said farther advanced position, said contact members can be caused to contact one another.

2. A selective code signal receiving device comprising: in combination, a movable control element normally biased in a first direction; a single propelling means for said control element, said propelling means, when engaged with said control element, being capable of moving said control element in small uniform increments only; means for engaging said propelling means with said control element for advancing said control element by uniform increments from a normal position to a first advanced position on receipt of a first pulse group, and thereafter from said first advanced position to a farther advanced position on receipt of a subsequent pulse group; a member carried by said control element at a point corresponding to said first advanced position; a slow releasing element responsive once to a pulse group and releasing upon the completition of said group; a blocking element carried by said slow releasing element, said blocking element obstructing the path of the said member and preventing further advancement of said control element when the said slow releasing element is actuated and moving out of the path of the said member upon a predetermined release movement less than full release of said slow releasing element; holding means releasable by actuation of the slow releasing element to engage said moveable control element and prevent retrograde movement of the control element except when the slow releasing element is fully released; a contact member carried by said control element and a second contact member fixed to said device, said contact members being so positioned that when said control element is at said farther advanced position, said contact members can be caused to contact one another.

3. An electric, selective code signal receiving device comprising: in combination, a movable control element normally biased in a first direction; propelling means for said control element, said propelling means, when engaged with said control element, being capable of moving said control element in small uniform increments only; means for engaging said propelling means with said control element for advancing said control element by uniform increments from a normal position to a first advanced position on receipt of a first pulse group, and thereafter from said first advanced position to a farther advanced position on receipt of a subsequent pulse group; a member carried by said control element at a point corresponding to said first advanced position; a slow releasing armature responsive once to a pulse group and releasing upon the completion of said group; means responsive to said slow releasing armature for engaging said control element whereby to retain said control element at said first advanced position on receipt of said first pulse group and release movement of the said slow releasing armature; a blocking element carried by the said slow releasing armature, said blocking element obstructing the path of the said member and preventing further advancement of said control element when the said slow releasing armature is actuated and moving out of the path of the said member upon a predetermined release movement less than full release of the said slow releasing armature; pawl means releasable by actuation of the slow releasing armature to engage said moveable control element and prevent retrograde movement of the control element except when the slow releasing armature is fully released; an electrical conductor carried by said control element and a second electrical conductor fixed to said device, said conductors being so positioned that when said control element is at said farther advanced position, said conductors can be caused to contact one another.

4. An electric, selective code signal receiving device comprising: in combination, a movable control element; propelling means for said control element, said propelling means, when engaged with said control element, being capable of moving said control element in small, uniform increments only; means for engaging said propelling means with said control element for advancing said control element by uniform increments from a normal position to a first advanced position on receipt of a first electric signal pulse group, and thereafter from said first advanced position to a farther advanced position on receipt of an additional electric signal pulse group, said propelling means having, as a driving unit therefor, a pulsing armature responsive to each cycle of current change within said pulse groups; a member carried by said control element at a point corresponding to said first advanced position; a slow releasing armature responsive once to a plurality of pulses constituting a pulse group and releasing upon the completion of said group; means responsive to said slow releasing armature for engaging said control element whereby to retain said control element at said first advanced position on receipt of said first pulse group and release of the said slow releasing armature; a blocking element carried by the said slow releasing armature, said blocking element obstructing the path of the said member and preventing further advancement of said control element when the said slow releasing armature is actuated and moving out of the path of the said member upon a predetermined release movement less than full release of the said slow releasing armature; pawl means releasable by actuation of the slow releasing armature to engage said moveable control element and prevent retrograde movement of the control element except when the slow releasing armature is fully released; an electrical conductor carried by said control element and a second electrical conductor fixed to said device, said conductors being so positioned that when said control element is at said farther advanced position, said conductors can be caused to contact one another.

5. An electric, selective code signal receiving device comprising: in combination, a movable control element normally biased in a first direction; propelling means for said control element, said propelling means, when engaged with said control element, being capable of moving said control element in uniformly small increments only; means for engaging said propelling means with said control element for advancing said control element by uniform increments from a normal position to a predetermined first advanced position on receipt of a first electric signal pulse group, and thereafter from said first advanced position to a farther advanced position on receipt of an additional electric signal pulse group, said propelling means having, as a driving unit therefor, a pulsing armature responsive to each cycle of current change within said pulse groups; a member carried by said control element at a point corresponding to said first advanced position; a slow releasing armature responsive once to a plurality of pulses constituting a pulse group and releasing upon the completion of said group; means responsive to said slow releasing armature for engaging said control element whereby to retain said control element at said first advanced position on receipt of said first pulse group and release of the said slow releasing armature; a blocking element carried by the said slow releasing armature, said blocking element obstructing the path of the said member and preventing further advancement of said control element when the said slow releasing armature is actuated and moving out of the path of said member upon a predetermined release movement less than full release of the said slow releasing armature; pawl means releasable by actuation of the slow releasing armature to engage said moveable control element and prevent retrograde movement of the control element except when the slow releasing armature is fully released; an electrical conductor carried by said control element at said farther advanced position; and a second electrical conductor carried by said slow releasing armature, said second conductor being so positioned that when said control element is at said farther advanced position and the said slow releasing armature is released, the said conductors will contact one another.

6. An electric, selective code signal receiving device comprising: a circular, rotatably mounted, biased control plate having a series of notches evenly spaced about the periphery thereof; a pawl for engaging the said notches and driving the said control plate solely in notch-wide increments; a pulsing armature for driving the said pawl whereby to provide means for engaging the said pawl with the said notches whereby to advance said control plate uniform increments from a normal position to a predetermined first advanced position on receipt of a first electric signal pulse group; a member carried by said control plate at a point corresponding to said first advanced position; a slow releasing armature responsive once to a pulse group and releasing upon the completion of said group; means responsive to said slow releasing armature for engaging said control plate whereby to retain said control plate at said first advanced position on receipt of said first pulse group and release of the said slow releasing armature; a blocking element carried by the said slow releasing armature, said blocking element obstructing the path of the said member and preventing further advancement of said control plate when the said slow releasing armature is actuated and moving out of the path of said member upon a predetermined release movement less than full release of the said slow releasing armature; pawl means releasable by actuation of the slow releasing armature to engage the said control plate and prevent retrograde movement of the control plate except when the slow releasing armature is fully released; an electrical conductor mounted on the said control plate at a farther advanced position; and a second electrical conductor mounted on the said slow releasing armature, said second conductor being so positioned that when the said slow releasing armature is released following receipt of a further pulse group, the said electrical conductors contact one another whereby to establish an electrical circuit therebetween.

7. The structure of claim 6 wherein at least two of the said members carried by said control plate are spaced between the said normal position and the said farther advanced position whereat the electrical circuit is established.

References Cited in the file of this patent

UNITED STATES PATENTS

| | | |
|---|---|---|
| 2,039,966 | Lockhart et al. | May 5, 1936 |
| 2,535,001 | Truesdall | Dec. 19, 1950 |
| 2,575,198 | Stickel | Nov. 13, 1951 |
| 2,595,614 | Stickel | May 6, 1952 |
| 2,601,154 | Krueger et al. | June 17, 1952 |
| 2,644,047 | Leonard | June 30, 1953 |
| 2,685,078 | Dale | July 27, 1954 |
| 2,754,495 | Sprecker et al. | July 10, 1956 |